United States Patent Office 3,519,621
Patented July 7, 1970

3,519,621
5H-DIBENZO[a,d]CYCLOHEPTENE DERIVATIVES
Leslie G. Humber, Dollard des Ormeaux, Quebec, Canada, assignor to American Home Products Corporation, New York, N.Y., a corporation of Delaware
No Drawing. Continuation-in-part of application Ser. No. 454,731, May 10, 1965. This application Oct. 16, 1967, Ser. No. 675,321
Int. Cl. C07c 87/28; C07d 51/76
U.S. Cl. 260—240                9 Claims

ABSTRACT OF THE DISCLOSURE

There are disclosed herein the compounds 2-(5-hydroxy - 10,11 - dihydro - 5H - dibenzo[a,d]cyclohepten - 5 - ylmethyl) - benzyldimethylamine and -pyrazine, 2-(10,11-dihydro-5H-dibenzo [a,d] cyclohepten-5-ylidenemethyl)-benzyldimethylamine and -pyrazine, and 2-(5-hydroxy - 5H - dibenzo[a,d] - cyclohepten - 5 -ylmethyl)-benzyldimethylamine. The compounds possess trichomonicidal and anti-inflammatory activities, and methods for their preparation and use are also given.

---

This application is a continuation-in-part of my earlier-filed application S.N. 454,731, filed may 10, 1965, now abandoned.

This invention relates to novel, pharmacologically useful, derivatives of 5H-dibenzo[a,d]cycloheptene and to a process for their preparation. Said derivatives, of generic structural Formula I, are basic in character and form salts with acids. Such salts with pharmacologically acceptable acids are biologically equivalent to the free bases.

The compounds of this invention are useful as trichomonicidal and anti-inflammatory agents.

As trichomonoicidal agents they may be formulated with suitable excipients such as, for example, starch, lactose, magnesium stearate, or magnesium silicate in the form of vaginal tablets or inserts containing from 50 to 250 mg. each of the active ingredient and may be applied once or twice daily for periods of time of up to fourteen days. As anti-inflammatory agents, they are particularly useful in the treatment of arthritic inflammations and may be formulated with similar excipients in the form of tablets or capsules for oral administration containing from 10 to 100 mg. each of the active ingredient, and may be administered daily in divided doses as low as 50 mg. and up to 250 mg. as required.

The compounds of this invention may be represented, generically, by Formula I:

(I) 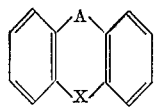

wherein A represents —CH$_2$—CH$_2$— or —CH=CH— and X represents a group such as =C=CH—Y (II), =CH—CH$_2$—Y (III), or =C(OH)—CH$_2$—Y (IV), and in which Y represents the 2-benzyldimethylamine, or the pyrazinyl group.

The compounds of this invention are conveniently prepared by reacting a cycloheptene-5-ketone (V), prepared as described by Campbell et al. in Helv. Chim. Acta, vol. 36, p. 1489 (1953), with a compound of the formula Y—CH$_3$ in the presence of a suitable basic condensing agent such as, for example, an alkali metal amide, alkoxide, alkyl, or aryl, to yield the corresponding 5-hydroxy derivatives of Formula I in which X represents the group IV. The latter compounds may be treated with an appropriate dehydrating agent such as, for example, a mineral acid or an organic anhydride, to yield the corresponding olefins of Formula I in which X represents the group II, and the latter compounds may be hydrogenated, for example, with hydrogen in the presence of a noble metal catalyst to yield the saturated compounds of Formula I in which X represents the group III.

Alternatively, the last-named compounds may be obtained directly from the compounds of Formula I in which X represents the group IV by treatment with a suitable hydrogenolyzing agent such as, for example, hydrogen iodide and red phosphorus, or hydrogen in the presence of a noble metal catalyst.

The above reactions may be represented by the following formulae, in which A and Y have the significance defined above.

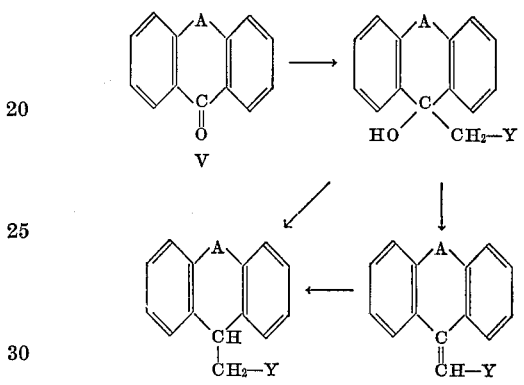

EXAMPLE 1

2-(5-hydroxy-10,11-dihydro-5H-dibenzo[a,d] cyclohepten-5-ylmethyl)-benzyl-dimethylamine Into a 500 ml. round bottom flask is added 2-methyl-benzyl-dimethylamine (24.6 gm., 0.165 mole) and butyl lithium (0.182 mole) dissolved in 100 ml. of heptane. The flask is filled with ether and allowed to stand at ambient temperature for 18 hours. This solution is added over a period of 30 minutes to a refluxing ethereal solution of 10,11 - dihydro - 5H - dibenzo[a,d]cyclohepten - 5 - one (41.7 gm., 0.2 mole). The mixture is stirred at room temperature for 4 hours and then water (1000 ml.) is added. The organic phase yields the title compound, M.P. 133–134° C, crystallized from hexane. The hydrochloride salt, prepared from the above base with hydrogen chloride, is crystallized from ethanol and has M.P. 206° C.

EXAMPLE 2

2 - (5 - hydroxy - 10,11 - dihydro - 5H - dibenzo[a,d] ylidenemethyl)-benzlydimethylamine 2-(5 - hydroxy - 10,11 - dihydro - 5H - dibenzo[a,d] cyclohepten-5-ylmethyl)-benzyldimethylamine (17.0 gm.) is refluxed in a mixture of glacial acetic acid (200 ml.) and concentrated HCl (20 ml.) for 2 hours. The solvents are evaporated in vacuo and the residue is distributed between chloroform and 10% aqueous sodium hydroxide. The organic phase yields the crude olefin as an oil. An aliquot crystallized from hexane has M.P. 81–82° C.

The hydrochloride salt of the title compound is prepared with ethereal hydrogen chloride and is crystallized from an acetone-methanol mixture, M.P. 234–236° C.

EXAMPLE 3

2-(5-hydroxy-5H-dibenzo[a,d]cyclohepten-5-ylmethyl)-benzyldimethylamine

In a manner similar to that described in Example 1, 2-methylbenzyl-dimethylamine (15.4 gm., 0.105 mole), butyllithium (0.114 mole) and 5H-dibenzo [a,d] cyclohepten-5-one (25.8 gm., 0.125 mole) are reacted together to yield the title compound, M.P. 162–163.5° C., upon crystallization from an acetone-hexane mixture.

EXAMPLE 4

2-(5-hydroxy-10,11-dihydro-5H-dibenzo[a,d] cyclohepten-5-ylmethyl)-pyrazine

Sodamide is prepared in liquid ammonia (250 ml.) from sodium (5.0 gm., 0.22 mole) in the usual manner. 2-methylpyrazine (18.8 gm., 0.2 mole) in 10 ml. of ether is added dropwise and the red mixture is stirred for 30 minutes. 10,11-dihydro-5H-dibenzo [a,d] cyclohepten-5-one (20.8 gm., 0.1 mole) dissolved in ether (250 ml.) is added dropwise. Stirring is continued for 1 hour and then 15 gm. of solid ammonium chloride is added. The ammonia is allowed to evaporate overnight and the remaining mixture is poured into ice water and neutralized with dilute hydrochloric acid. The title product separates as a solid; it is isolated by filtration, and crystallized from ethanol, M.P. 111–114° C.

EXAMPLE 5

2-(10,11-dihydro-5H-dibenzo[a,d]cyclohepten-5-ylidenemethyl)pyrazine

2 - (5 - hydroxy-10,11-dihydro-5H-dibenzo[a,d]cyclohepten-5-ylmethyl)pyrazine (10.0 gm.) is refluxed for 3 hours in a mixture of glacial acetic acid (100 ml.) and concentrated hydrochloric acid (20 ml.). Most of the acetic acid is removed by distillation and the residue is distributed between benzene and aqueous sodium carbonate. The benzene phase yields the title compound, M.P. 123–124° C. upon crystallization from methanol. The hydrochloride salt is prepared from the above base with hydrogen chloride and has M.P. 150–155° C. upon crystallization from isopropanol.

I claim:

1. A compound selected from the group which consists of compounds of the formula:

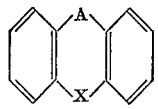

wherein A is selected from the group which consists of —CH$_2$—CH$_2$— and —CH=CH—; X is selected from the group which consists of =C=CH—Y,

=CH—CH$_2$—Y and =C(OH)—CH$_2$—Y; and Y is selected from the group which consists of 2- benzyldimethylamine and 2-pyrazinyl; and salts of said compounds with pharmacologically acceptable acids.

2. A compound of the formula:

wherein A is selected from the group which consists of —CH$_2$—CH$_2$— and —CH=CH—; X is selected from the group which consists of =C=CH—Y,

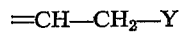

=CH—CH$_2$—Y and =C(OH)—CH$_2$—Y; and Y is selected from the group which consists of 2-benzyldimethylamine and 2-pyrazinyl.

3. 2 - (10,11 - dihydro-5H-dibenzo[a,d]cyclohepten-5 - ylidenemethyl) - benzyldimethylamine, as claimed in claim 1.

4. The hydrochloride salt of 2-(10,11-dihydro-5H-dibenzo[a,d]cyclohepten-5-ylidenemethyl) - benzyldimethylamine, as claimed in claim 1.

5. 2 - (10,11 - dihydro-5H-dibenzo[a,d]cyclohepten-5-ylidenemethyl)-pyrazine, as claimed in claim 1.

6. The hydrochloride salt of 2-(10,11-dihydro-5H-dibenzo[a,d]cyclohepten - 5 - ylidenemethyl) - pyrazine, as claimed in claim 1.

7. 2 - (5 - hydroxy-10,11-dihydro-5H-dibenzo[a,d]cyclohepten-5-ylmethyl)-benzyldimethylamine, as claimed in claim 1.

8. 2 - (5 - hydroxy-5H-dibenzo[a,d]cyclohepten-5-ylmethyl)-benzyldimethylamine, as claimed in claim 1.

9. 2 - (5 - hydroxy-10,11-dihydro-5H-dibenzo[a,d]cyclohepten-5-ylmethyl)-pyrazine, as claimed in claim 1.

References Cited

Bergmann et al.: Bull. Soc. Chim. France, 1951, pp. 684 to 692.

JOHN D. RANDOLPH, Primary Examiner

U.S. Cl. X.R.

260—250, 570.9, 999